United States Patent [19]
Johnson et al.

[11] Patent Number: 5,189,723
[45] Date of Patent: Feb. 23, 1993

[54] BELOW GROUND CROSS-CONNECT/SPLICE SYTEM (BGX)

[75] Inventors: Stephen M. Johnson, St. Paul; Calvin Huggar, Sr., Minneapolis; Roy L. Henneberger, Eagan, all of Minn.

[73] Assignee: ADC Telecommunications, Inc., Minneapolis, Minn.

[21] Appl. No.: 816,558

[22] Filed: Jan. 6, 1992

[51] Int. Cl.$^5$ .............................. G02B 6/00; G02B 6/36
[52] U.S. Cl. ........................................................ 385/134
[58] Field of Search ................................ 385/134–140

[56] References Cited
U.S. PATENT DOCUMENTS

| | | |
|---|---|---|
| 4,502,754 | 3/1985 | Kawa .......................... 385/135 X |
| 4,752,110 | 6/1988 | Blanchet et al. ................ 385/134 X |
| 4,812,004 | 3/1989 | Biederstedt et al. ................ 385/135 |
| 4,884,863 | 12/1989 | Throckmorton .................... 385/135 |
| 5,024,498 | 6/1991 | Becker et al. ..................... 385/134 X |
| 5,109,467 | 4/1992 | Hogan et al. ........................ 385/135 |

*Primary Examiner*—Akm E. Ullah
*Attorney, Agent, or Firm*—Merchant, Gould, Smith, Edell, Welter & Schmidt

[57] ABSTRACT

A below ground fiber cable management system includes a base member having corrosion-resistant walls defining a base member interior. A termination box is provided sized to be received within the interior. A box actuator moves the termination box from said interior to permit access to said box and access to the base member interior.

6 Claims, 8 Drawing Sheets

BELOW GROUND CROSS-CONNECT/SPLICE SYTEM (BGX)

BACKGROUND OF THE INVENTION

1. Field of the Invention

This invention pertains to the telecommunications system. Particularly, this invention pertains to a fiber cable management system for storing and maintaining fibers below grade.

2. Description of the Prior Art

The use of optical fibers in telecommunications industry is becoming increasingly common. Optical fiber terminations are extending from central offices to the field. As a result, it is necessary to provide for means to store and have access to optical fiber and cross-connect or inter-connect equipment in the field.

SUMMARY OF THE INVENTION

According to a preferred embodiment of the present invention, a below ground fiber optic cable management system is described. The cable management system includes a base member having a plurality of corrosion resistant walls which cooperate to define a base member interior. The walls also define an opening on an upper end of the base member and exposing the interior. A cover is provided sized to cover the opening with the cover being releasably secured to the member in watertight closure. A cross-connect box is provided and sized to be received within the interior and pass through the opening. The box has walls which define a box interior sized to receive cross-connect equipment. A box cover is provided for covering the box interior and sealing the interior from its exterior in watertight closure. A box actuator is provided for securing the box to the base member and for selectively moving the box from the interior and out of the member through the opening.

DESCRIPTION OF THE PREFERRED EMBODIMENT

Referring now to several drawing figures in which identical items are numbered throughout, a description of the preferred embodiment of the present invention will now be provided.

Figure 1:
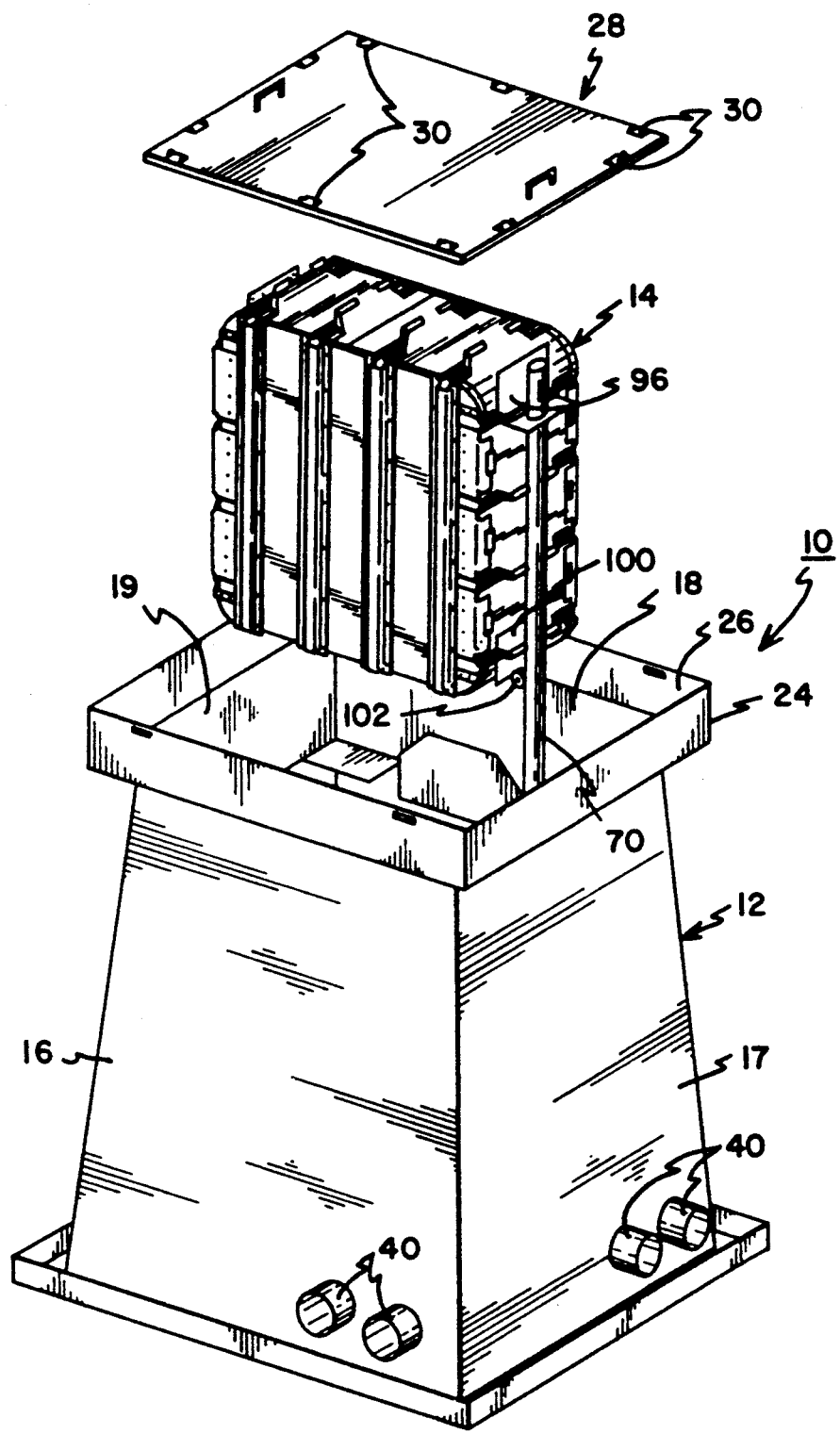
FIG. 1 is a perspective view of the apparatus of the present invention showing the box in a working position and disposed over an opening of a base member.

In FIG. 1, a below ground fiber cable management system 10 is shown as including a base member of shell 12, a cross-connect box 14 and a cover 28.

Figure 3:
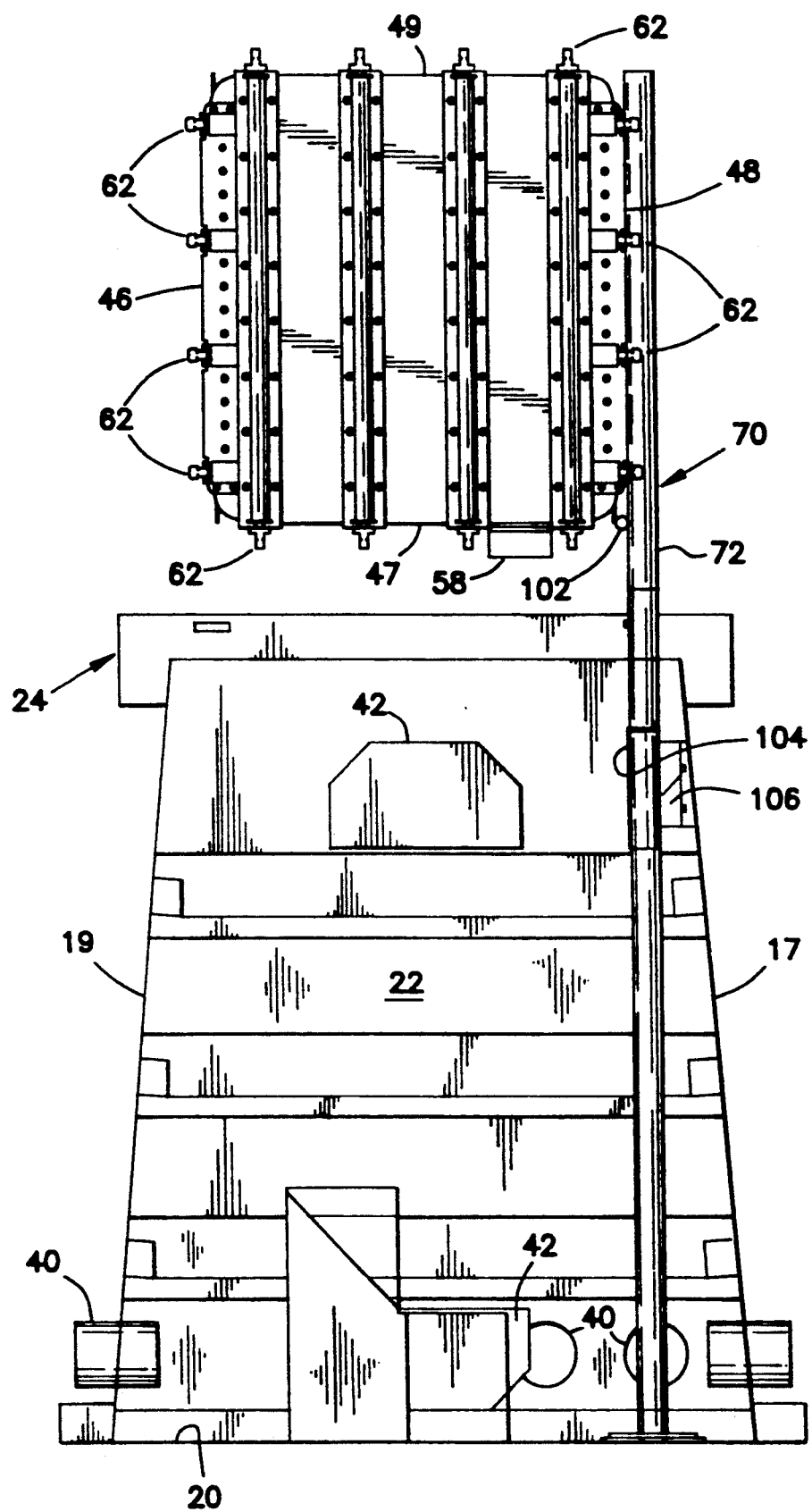
FIG. 3 is a front elevational view of the apparatus of the present invention partially removed showing a box actuator and cable management.
Figure 4:
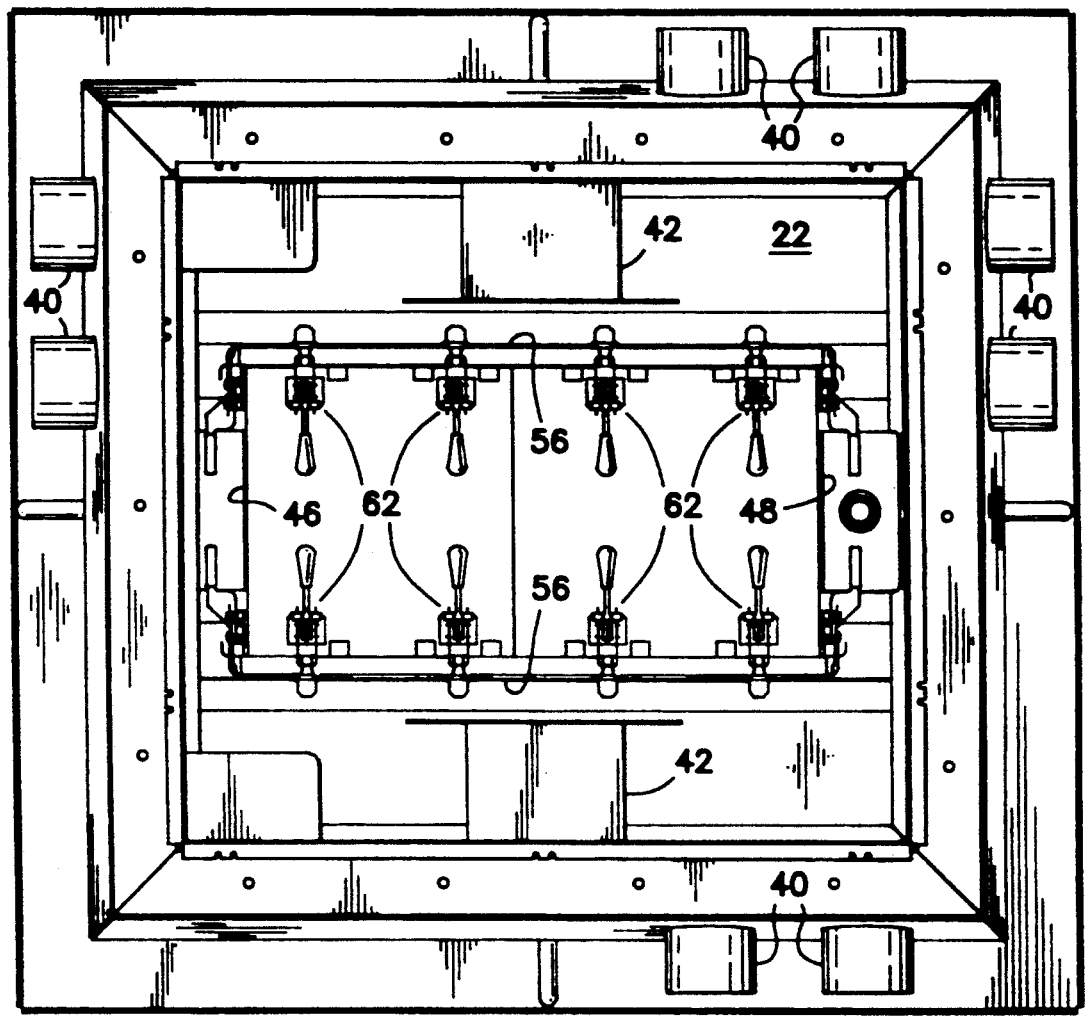
FIG. 4 is a top plane view of the apparatus of the present invention.
Figure 5:
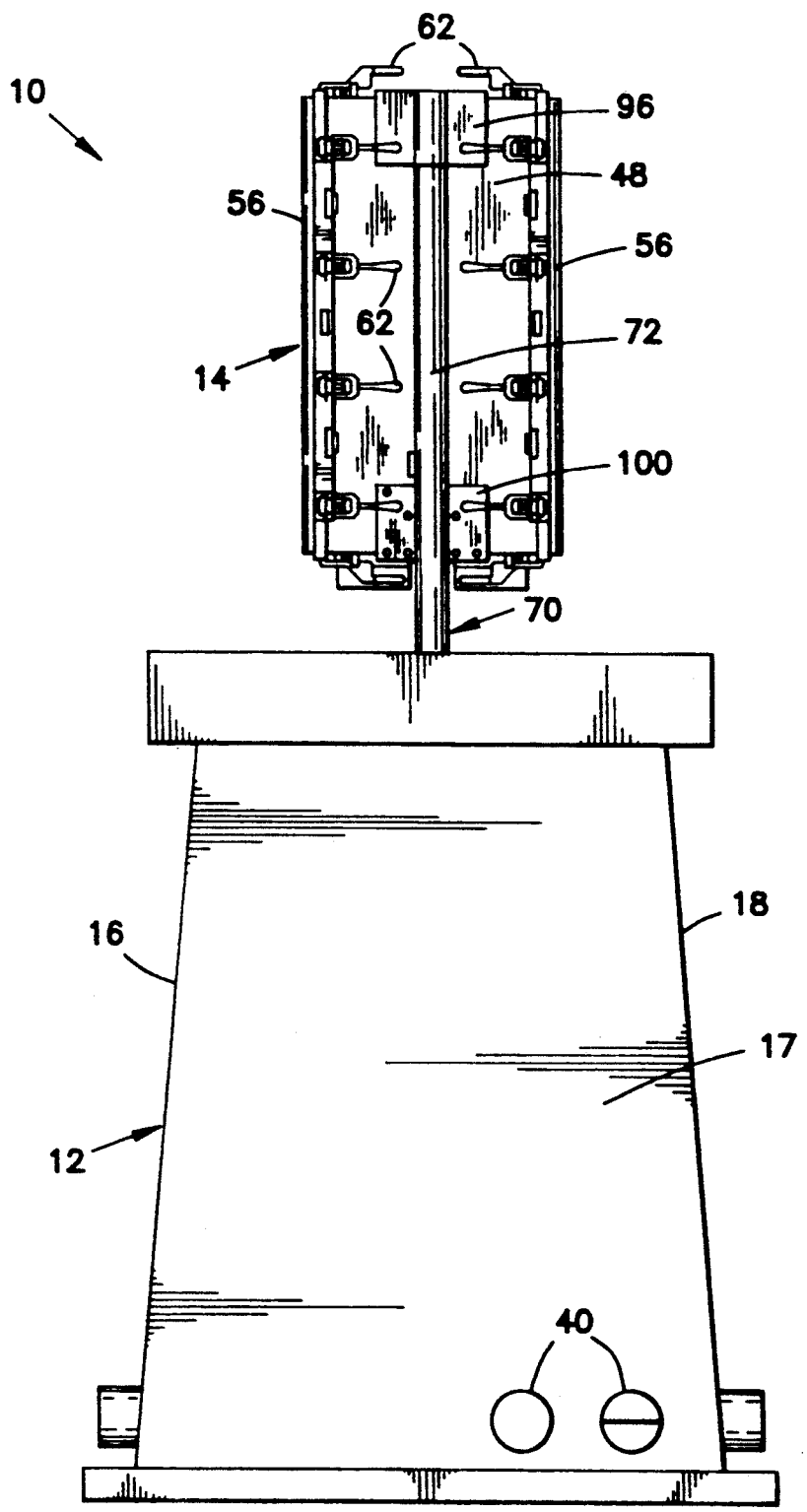
FIG. 5 is a side elevational view of the apparatus of the present invention.

The shell 12 is generally frusto-pyramid in shape and includes four inwardly-angled side walls 16-19 and a common base 20 (see FIG. 3). The base 20 and side wall 16-19 are integrally formed to define a watertight shell interior 22. At an upper end 24 of the shell 12, the side walls 16-19 define an opening 26. A cover 28 is provided sized to cover opening 26. Any suitable means 30 are provided for fastening the cover 28 to the shell 12 in watertight sealing engagement with the cover being releasable from the shell 12. Preferably, cover 28 is provided with seal (not shown) to seal against shell 12. In a preferred embodiment, the shell 12 is sized to permit a worker to enter into the interior 22 through opening 26 and perform necessary cable management functions.

In intended use, the shell 15 placed in a hole formed in the ground with opening 26 generally flush with the surface of the ground.

Since shell 12 is being placed in a corrosive environment underground, it is preferred that shell 12 be made of corrosive-resistant material. For example coated cold-rolled steel or stainless steel are utilized in forming shell 12. The welding of shell 12 are provided such that the shell can withstand a six foot pressure head without leakage.

A plurality of cable ducts 40 are provided extending through side wall 16-19. The cable ducts 40 permit passage of fiber optic cables or other cables from underground runs into the interior 22. The cable ducts 40 are sealed through and suitable means for example through use of duct plugs (not shown) which are commercially available items.

Within interior 22, cable management spools 42 (see FIG. 3) are provided fastened to the interior surfaces side wall 16-19 to permit excess cable to be wound around spools 42 to prevent further damage to incoming cables.

Figure 8:
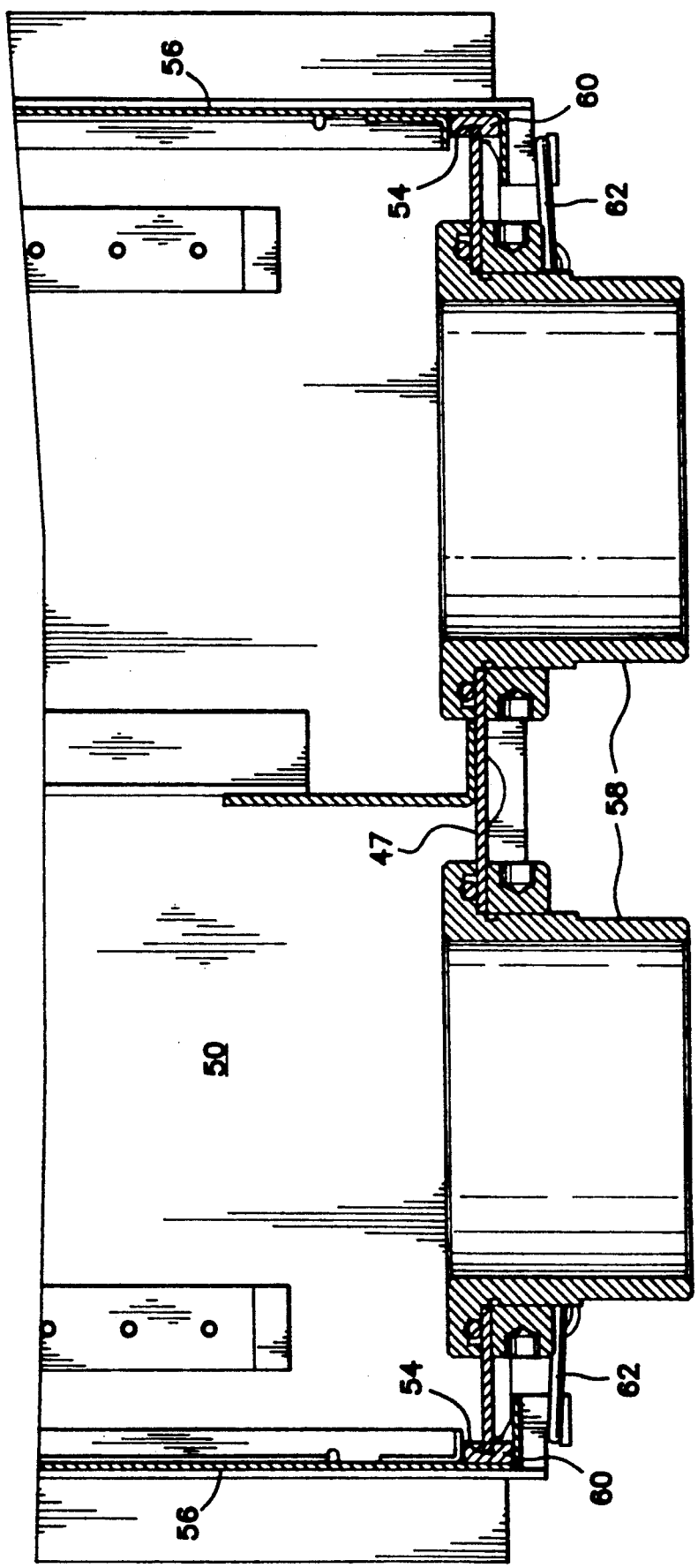
FIG. 8 is an enlarged sectional view of a portion of the box for use with the present invention.

As shown in the figures, cross-connect box 14 is a rectangular-shaped box having four side walls 46-49 which cooperate to define a box interior 50 (FIG. 8). The cable cross-connect box 14 is sized to be completely received within interior 22 and passed through opening 26. Outer edges 52 (FIG. 8) of the box 14 define an opening to the interior 50. Commercially available cross-connect equipment, splice equipment or the like may be passed through opening and disposed within interior 50. Box cover plates 56 are provided to cover the openings and seal interior 50 from the exterior of the box 14.

As shown best in FIG. 8 the bottom wall 47 of the box is provided with a duct opening 58. The duct 58 permits passage of fiber from shell interior 22 into box interior 50. Duct 58 can be sealed through a duct plug (not shown) similar to the sealing of ducts 40. The cover plates 56 are provided with a resilient gasket 60 surrounding a periphery of the plate 56 on an inside surface of the plate 56. The gasket 60 is disposed to engage box edges 52 in sealing engagement when the cover plate 56 is attached to the box side walls 46-49. Over-center locking latches 62 are provided to securely attach the cover plates 56 to the side walls 46-49. In a preferred embodiment, gasket 60 and latches 62 as well as the steel mechanical construction of box 14 are selected such that box 14 can withstand pressures of about six pounds per square inch without leakage.

An actuator 70 is provided to permit lifting of the box 14 from interior 22 to permit access to the interior of the box 14. The actuator 70 is shown in schematic format in FIG. 7.

Figure 7:
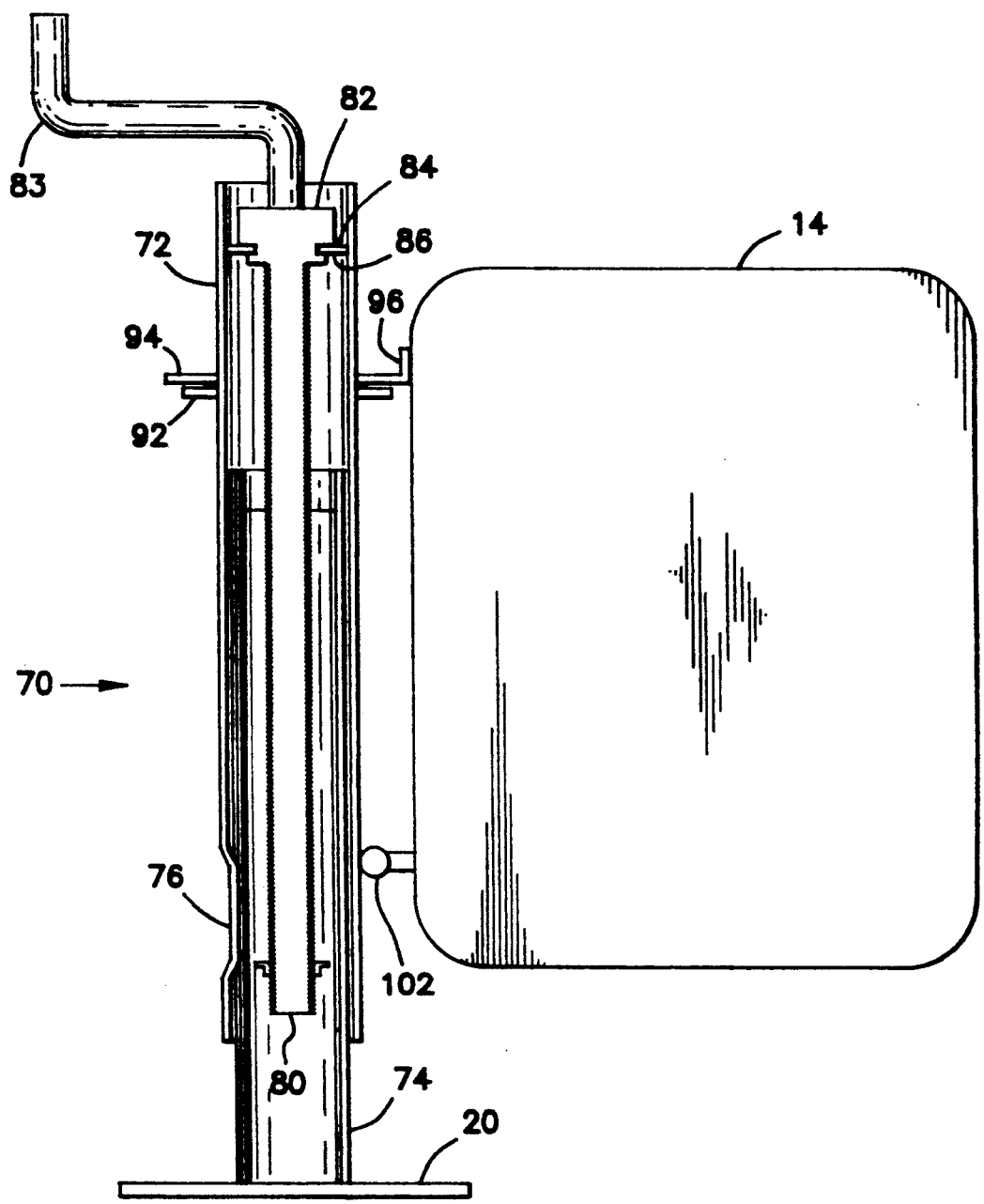
FIG. 7 is a schematic representation of the mechanical actuator for use with the present invention.

As shown in FIG. 7, actuator 70 includes concentric tubes including an outer tube 72 and an inner tube 74. Tube 74 extends vertically from floor 20 and is secured through floor 20 through any suitable means. Tube 72 is concentrically aligned in siding engagement on tube 74. A key 76 prevents relative rotation of tube 72 relative to tube 74 while permitting axial movement of tube 72 relative to tube 74.

A threaded shaft 80 is axially disposed extending along the axis of tubes 72 and 74. An upper end 82 of shaft 80 has a retaining head with an angular groove 84 sized to receive an angular flange 86 inwardly projecting from outer tube 72. Accordingly, shaft 80 may rotate relative to tube 72 but moves axially with tube 72.

A threaded nut 88 is fixed to the inner surface of inner tube 74. Threaded shaft 80 is threadedly received within nut 88. Accordingly, as shaft 82 rotates, outer tube 72 moves axially relative to tube 74. Shaft 80 may be rotated by a motor 90 or may be manually rotated as indicated by handle 83.

Figure 6:
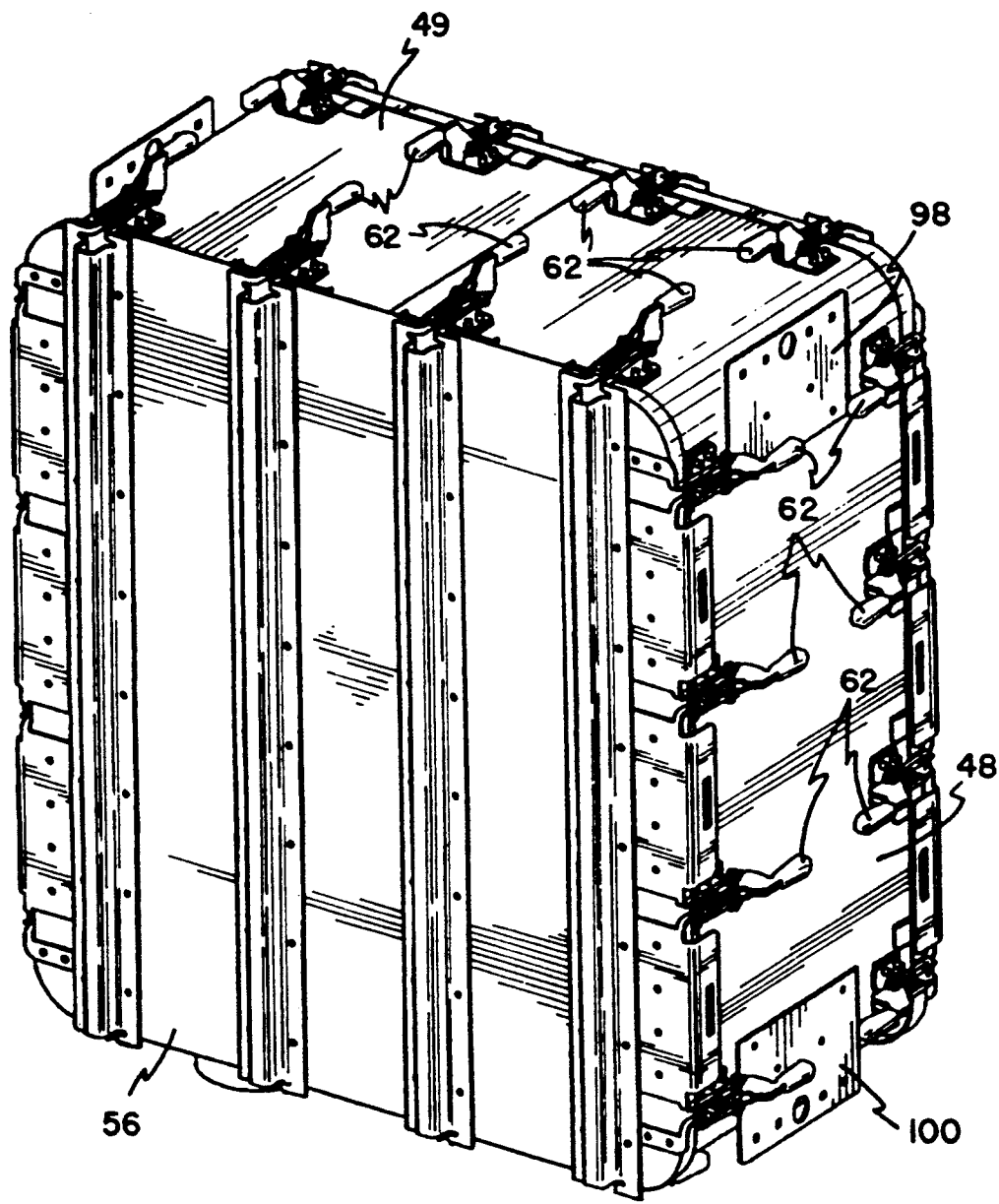
FIG. 6 is a perspective view of a box for use with the present invention.

A radial support flange 92 projects radially outwardly from outer tube 72. A support ring 94 rests on an upper surface of flange 92. Support ring 94 is freely rotatable about outer tube 72. For wear resistance, a bushing, nylon washer or other friction-reduction mechanism may be provided between ring 94 and flange 92. Ring 94 carries a support bracket 96 which is attached to a box top mounting bracket 98 (FIG. 6). The box 14 also has a bottom mounting bracket 100. A roller 102 is secured to bottom mounting bracket 100 and disposed to rest against tube 72 but be in bias against tube 72.

Figure 2:
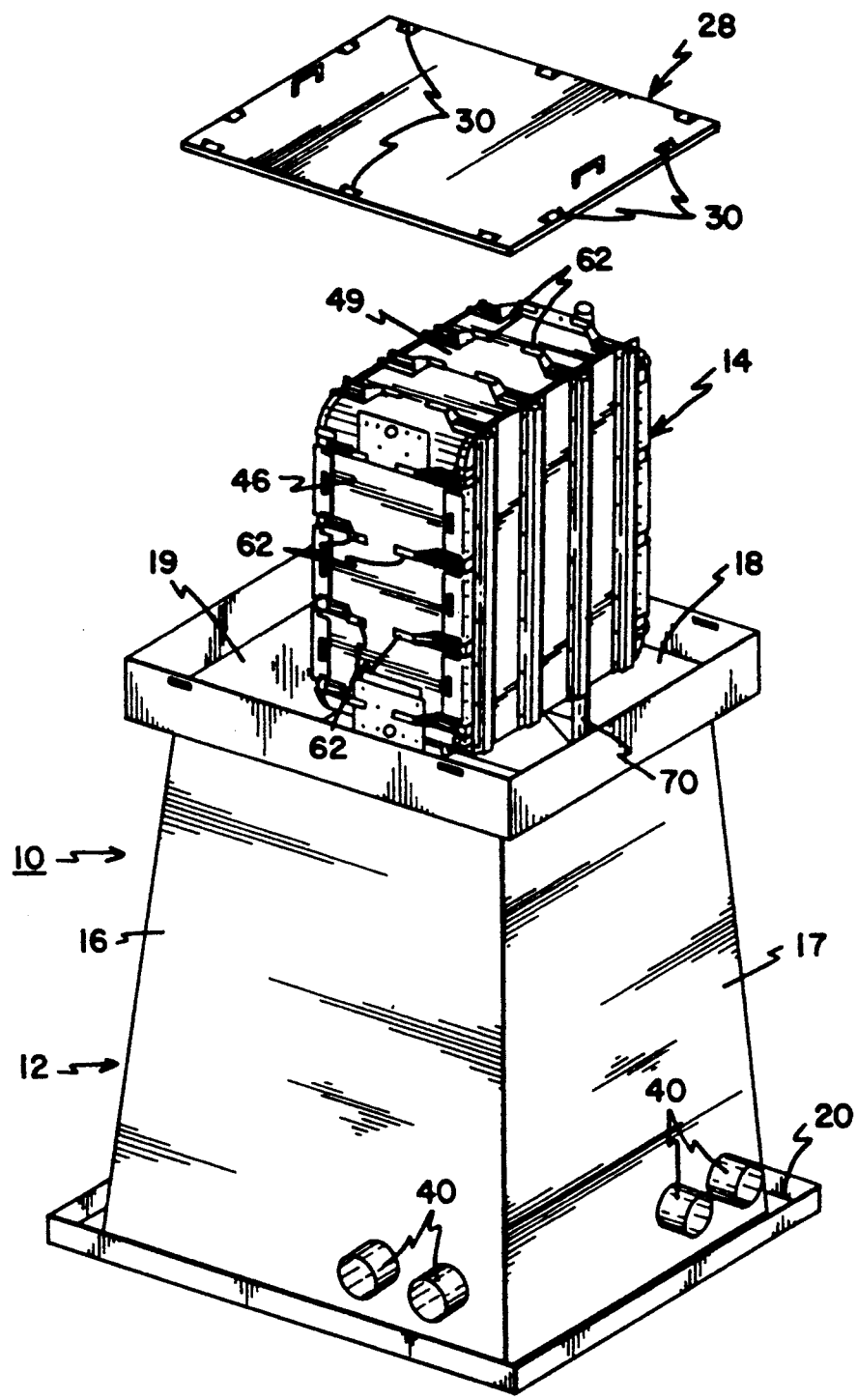
FIG. 2 is the view of FIG. 1 with the box member shown rotated to permit access to the interior of the base member.

To secure actuator 70 within the shell 12, a support sleeve 104 is provided surrounding outer tube 72. Support sleeve 104 permits tube 72 to freely move axially within sleeve 104. The sleeve 104 is connected to shell side wall 17 through a mounting bracket 106. Accordingly, as the box 14 rises, the roller 102 rests against tube 72. The roller 102 passes over sleeve 104 as the box 14 rises or lowers. With the rotational movement of support ring 94, the box may be rotated away from its normal position (shown in FIG. 1) to a rotated position (shown in FIG. 2). In the rotated position, a worker standing at ground level has easy access to the interior 50 of the box 14. Also, the worker has ready access to the interior of the shell 12.

With the structure thus described, it will be appreciated that the present invention provides for a field fiber optic management system which can be placed below ground but has ready access to a worker. The system provides for cable management as well as cable protection from the elements. Also, the cross-connection locations within the box are readily accessible through lowering or raising the box and pivoting the box to a work position. These and other benefits of the present invention will be apparent to one skilled in the art having the benefits of the teachings of the present disclosure. Modifications and equivalence of the disclosed concepts are intended to be included within the claims of the present invention.

What is claimed is:

1. A below ground fiber cable management system comprising;
   a base member having a plurality of corrosion-resistant walls cooperating to define a base member interior, said walls defining an opening on an upper end of said member and exposing said interior;
   a base member cover sized to cover said opening and having means for securing said cover to said member and releasably closing said opening in watertight closure;
   a termination box sized to be received within said interior and pass through said opening, said box having walls defining a box interior and sized to receive fiber optic termination equipment, sealing means for sealing said box openings in watertight sealant;
   a box actuator for securing said box to said member and having means for selectively moving said box from said interior and out of said member through said base member opening.

2. A below ground fiber cable management system according to claim 1 wherein said box actuator includes means for pivoting said box away from said base member to provide unobstructed access to an interior of said base member.

3. A below ground fiber cable management system according to claim 1 wherein said box is secured to said box actuator by a first rigid support and a second releasable support disposed in resilient moving engagement against said actuator.

4. A below ground fiber cable management system according to claim 1 comprising cable management means disposed within said base member.

5. A below ground fiber cable management system according to claim 1 comprising means for providing cable ingress and egress to said base member.

6. A below ground fiber cable management system according to claim 1 comprising means for providing cable ingress and egress to said box.

* * * * *